US011413910B2

(12) United States Patent
Mancini et al.

(10) Patent No.: US 11,413,910 B2
(45) Date of Patent: Aug. 16, 2022

(54) METHOD AND APPARATUS FOR APPLYING NOISE REDUCING ELEMENTS TO TYRES FOR VEHICLE WHEELS AND TYRES PROVIDED WITH SUCH NOISE REDUCING ELEMENTS

(71) Applicant: Pirelli Tyre S.p.A., Milan (IT)

(72) Inventors: Gianni Mancini, Milan (IT); Cristiano Puppi, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 828 days.

(21) Appl. No.: 16/086,229

(22) PCT Filed: Mar. 29, 2017

(86) PCT No.: PCT/IB2017/051792
§ 371 (c)(1),
(2) Date: Sep. 18, 2018

(87) PCT Pub. No.: WO2017/168340
PCT Pub. Date: Oct. 5, 2017

(65) Prior Publication Data
US 2020/0290408 A1  Sep. 17, 2020

(30) Foreign Application Priority Data
Mar. 31, 2016 (IT) ........................ 102016000033082

(51) Int. Cl.
*B60C 19/00* (2006.01)
*B29D 30/00* (2006.01)
*B29D 30/06* (2006.01)

(52) U.S. Cl.
CPC ........ *B60C 19/002* (2013.01); *B29D 30/0061* (2013.01); *B29D 30/0681* (2013.01); *B29D 2030/0038* (2013.01); *B65H 2801/93* (2013.01)

(58) Field of Classification Search
CPC ..................................................... B60C 19/002
See application file for complete search history.

(56) References Cited

U.S. PATENT DOCUMENTS

2008/0099117 A1  5/2008  Tanno
2009/0277549 A1  11/2009  Tanno
(Continued)

FOREIGN PATENT DOCUMENTS

EP   2 017 092 A1   1/2009
EP   2 067 633 A1   6/2009
(Continued)

OTHER PUBLICATIONS

International Search Report form the European Patent Office in corresponding International Application No. PCT/IB2017/051792 dated Jul. 5, 2017.
(Continued)

*Primary Examiner* — Timothy Kennedy
*Assistant Examiner* — Alexander A Wang
(74) *Attorney, Agent, or Firm* — Finnegan, Henderson, Farabow, Garrett & Dunner, L.L.P.

(57) ABSTRACT

The present invention relates to a method and an apparatus for applying noise reducing elements to tyres for vehicle wheels. Noise reducing elements (12), all equal to each other, are fed in succession on a conveyor (20) according to a predetermined path and are oriented on the predetermined path all in the same way. Tyres (2) of different sizes (C, P) are fed in succession on a conveyor (20) up to an application station (34). In the application station (34), the noise reducing elements (12) are picked up from the conveyor (20) and applied to radially inner surfaces of the tyres (2). The application comprises: arranging the noise reducing elements (12) with the larger dimension (L) directed in a circumferential direction or arranging the noise reducing (Continued)

elements (12) with the larger dimension (L) directed in an axial direction as a function of the sizes (C, P) of the tyre (2) in which they are applied.

15 Claims, 9 Drawing Sheets

(56) References Cited

U.S. PATENT DOCUMENTS

2009/0277551 A1 11/2009 Yukawa
2010/0012244 A1 1/2010 Tanno et al.
2012/0037294 A1 2/2012 Yukawa
2012/0175032 A1 7/2012 Yukawa
2015/0306922 A1 10/2015 Kim et al.

FOREIGN PATENT DOCUMENTS

EP 2 123 491 A1 11/2009
EP 2 862 702 A1 4/2015
EP 2 937 231 A1 10/2015
KR 10-2010-0043653 4/2010

OTHER PUBLICATIONS

Written Opinion of the International Searching Authority from the European Patent Office in corresponding International Application No. PCT/IB2017/051792 dated Jul. 5, 2017.

METHOD AND APPARATUS FOR APPLYING NOISE REDUCING ELEMENTS TO TYRES FOR VEHICLE WHEELS AND TYRES PROVIDED WITH SUCH NOISE REDUCING ELEMENTS

This application is a section 371 national phase application based on International Application No. PCT/IB2017/051792, filed Mar. 29, 2017, and claims the priority of Italian Patent Application No. 102016000033082, filed Mar. 31, 2016; the content of each application is incorporated herein by reference.

TECHNICAL FIELD OF THE INVENTION

The present invention relates to a method and an apparatus for applying noise reducing elements to tyres for vehicle wheels. The present invention also relates to tyres for vehicle wheels, wherein each of the tyres comprises such noise reducing elements.

The present invention falls within the field of processes and apparatuses for manufacturing tyres for vehicle wheels.

In particular, the present invention relates to a method and an automatic or semi-automatic apparatus for applying noise reducing elements to tyres for vehicle wheels.

The term "automatic" is used to indicate a method and an apparatus in which substantially all the operations are carried out by mechanical devices (such as with electric, pneumatic, hydraulic actuation) preferably controlled by a control unit and by means of suitable software. The term "semi-automatic" is used to indicate a method and an apparatus in which most of the implemented operations are carried out by the mechanical devices mentioned above and the operator's manual intervention is reduced to few and specific operations.

BACKGROUND ART

A tyre for vehicle wheels generally comprises a carcass structure comprising at least one carcass ply having axially opposite end flaps engaged with respective annular anchoring structures. A belt structure is associated in a radially outer position to the carcass structure, comprising one or more belt layers, arranged in radial superposition with respect to each other and with respect to the carcass ply, having textile or metallic reinforcing cords with crossed orientation and/or substantially parallel to the circumferential development direction of the tyre. A tread band is applied in a position radially outer to the belt structure, also made of elastomeric material like other semi-finished products making up the tyre.

Respective sidewalls of elastomeric material are further applied on the lateral surfaces of the carcass structure, each extending from one of the lateral edges of the tread band up at the respective annular anchoring structure to the beads. In "tubeless" tyres, the carcass ply is internally coated by a preferably butyl-based layer of elastomeric material, usually called "liner" having optimal airtight characteristics and extending from one to the other of the beads.

The term "elastomeric material" is used to designate a composition comprising at least one elastomeric polymer and at least one reinforcement filler. Preferably, such composition further comprises additives such as, for example, a cross-linking agent and/or a plasticiser. Due to the presence of the cross-linking agent, such material can be cross-linked by heating, so as to form the final manufactured article.

The expression "noise reducing element" means an element which, once associated with a radially inner surface of a tyre, has the ability to attenuate the noise produced by the cavity (cavity noise) delimited between the tyre and the rim on which it is mounted during use. This ability is usually imparted to said element by the type of material, or materials, of which said element is made and/or by the size of the same and/or by the number of elements inserted in the cavity. Such noise reducing elements usually consist of blocks of porous material such as, for example, foamed polymeric material, which are effective in reducing the noise and are compatible with the use in the tyre.

By "equatorial plane" of the tyre it is meant a plane perpendicular to the axis of rotation of the tyre and which divides the tyre into two symmetrically equal parts.

The terms "radial" and "axial" and the expressions "radially inner/outer" and "axially inner/outer" are used referring to a direction perpendicular and a direction parallel to the axis of rotation of the tyre, respectively.

The terms "circumferential" and "circumferentially" are used with reference to the direction of the annular development of the tyre, namely the rolling direction of the tyre.

Document EP2067633 describes a noise reduction device and a tyre, in which the tyre vibration and noise can be reduced. The noise reduction device comprises two main noise reducing elements adapted to change the sectional area of a cavity of the tyre and two auxiliary noise reducing elements arranged between the two main noise reducing elements.

Document EP2123491 describes a noise reduction device comprising at least one noise reducing element made of porous material attached to the inner surface of the tread portion of the tyre. The noise reducing element may include a plurality of parts arranged spaced apart along a circumferential direction of the tyre.

SUMMARY

In the context of soundproof tyres, the Applicant has felt the need to increase the productivity of processes and lines dedicated to the manufacture of tyres provided with noise reducing elements and to improve the quality and performance of this type of tyres.

The Applicant has observed that known noise reducing elements can be made in the form of strips or blocks of porous material, such as substantially parallelepiped in shape which are glued to the radially inner surface of the tyre and arranged sequentially one after the other along the circumferential development of the tyre itself.

The Applicant noted that the industrial production of tyres involves managing tyres of different sizes. Plants for the industrial production of tyres are able to manage, also simultaneously, different types of tyres (randomisation of production) in order to exploit, thereby increasing productivity, the actual availability of starting materials (like such as compounds, semi-finished products, etc.) and/or parts/elements of the plant (such as moulding drums and/or vulcanisation moulds, etc.) that is optimised upstream by manufacturing different moulds.

The Applicant noted that, in order to obtain the desired soundproof properties, tyres of different size (for example in terms of diameter, maximum section width, sectional height etc.) such as to delimit inner cavities with different volumes are provided with noise reducing elements of different sizes, as well as in variable number, and such as to occupy a certain part of the volume of the cavity.

The Applicant has therefore noted that, because of the above randomisation of production, also the management of blocks of porous material that define the noise reducing elements is complex, since each type of tyre exiting the manufacturing line is suitably provided with specific noise reducing elements, having such a size as to be physically placed in the cavities and such as to properly carry out their noise reduction task. Apparatuses designed for the management and the application of noise reducing elements are typically constantly set and tuned in order to properly handle noise reducing elements of different types, at the expense of efficiency of the manufacturing process and cost of the plant. In fact, the production of different tyres, requiring different noise reducing elements, implies the interruption of production and preparation of apparatuses to use materials of appropriate size with respect to the size of the tyres to be treated.

In this context, the Applicant therefore felt the need to intervene on the method by which said noise reducing elements are managed and applied to the tyre.

The Applicant perceived that, in order to obviate the above-mentioned drawbacks, it may be useful to develop a strategy for managing, handling and gluing noise reducing elements that allows gluing to each other equal noise reducing elements in tyres of different size exiting in a non-predefined manner from the manufacturing line.

The Applicant found that by feeding in a sequence noise reducing elements all equal to each other and then picking up and suitably orienting the same before applying them to the tyre, the efficiency of the apparatus and of the process can be improved while maintaining the effectiveness of noise reduction in the finished tyres.

According to one aspect thereof, the present invention relates to a method for applying noise reducing elements to tyres for vehicle wheels, comprising:

feeding in a sequence noise reducing elements according to a predetermined path, wherein said noise reducing elements have all the same shape and have all in plan substantially a same larger dimension and a same smaller dimension;

feeding in a sequence a plurality of tyres for vehicle wheels, wherein at least one of the tyres of said plurality has sizes different from the others;

picking up the noise reducing elements from the predetermined path;

applying the noise reducing elements to radially inner surfaces of the tyres.

The term "same shape" referred to the noise reducing elements means that such elements have, at least in the plan, the same geometric figure. For example, the noise reducing elements may have a rectangular shape in plan.

The term "substantially" referred to the larger and smaller dimensions of the noise reducing elements it is meant with the exception of any manufacturing (due, for example, to cutting operations) and/or handling tolerances. Said manufacturing and/or handling operations usually involve dimensional changes of the noise reducing elements not greater than about 3% more or less than the predefined size.

Preferably, applying comprises: orienting the noise reducing elements as a function of the sizes of the tyre to which they are applied.

Preferably, orienting comprises: arranging the noise reducing elements with the larger dimension directed in a circumferential direction or arranging the noise reducing elements with the larger dimension directed in an axial direction with respect to said tyre.

According to a different aspect thereof, the present invention relates to an apparatus for applying noise reducing elements to tyres for vehicle wheels, comprising:

a conveyor extending along a predefined path, wherein said conveyor is configured to support and advance in a sequence a plurality of noise reducing elements;

an application station configured to receive a tyre at a time coming from a production line of tyres;

a picking up and application device comprising a picking up and application head;

wherein the picking up and application head is movable between the conveyor and the application station for picking up at least one noise reducing element at a time and applying it on a radially inner surface of the tyre placed in the application station.

Preferably, a control unit is operatively connected at least to the picking up and application device.

Preferably, the control unit is configured to drive said picking up and application device so as to orient the application head and said at least one noise reducing element carried by it during the picking up and/or during the application as a function of dimensions of the tyre in which said at least one noise reducing element is applied.

Preferably, orienting comprises: arranging the noise reducing elements with the larger dimension directed in a circumferential direction with respect to said tyre or arranging the noise reducing elements with the larger dimension directed in an axial direction with respect to said tyre.

According to a further aspect, the present invention relates to a plant for making tyres for vehicle wheels, comprising: an apparatus for manufacturing green tyres for vehicle wheels comprising manufacturing devices for manufacturing a green tyre; at least one moulding and vulcanisation unit operatively arranged downstream of the manufacturing apparatus; at least one apparatus for applying noise reducing elements to tyres for vehicle wheels according to the present invention. Preferably, said at least one apparatus for applying noise reducing elements is operatively arranged downstream of said at least one moulding and vulcanisation unit.

According to a further aspect thereof, the present invention relates to a process for manufacturing tyres for vehicle wheels, comprising: manufacturing a plurality of green tyres; wherein at least one of the green tyres has sizes different from the others; moulding and vulcanising the green tyres; applying noise reducing elements to the moulded and vulcanised tyres according to the process of the present invention.

According to a further aspect thereof, the present invention relates to a process for manufacturing tyres for vehicle wheels, comprising:

feeding in a sequence noise reducing elements according to a predetermined path, wherein said noise reducing elements have all the same shape and have all in plan substantially a same larger dimension and a same smaller dimension;

feeding in a sequence a plurality of tyres for vehicle wheels;

taking the measures of said tyres;

setting the orientation of the noise reducing elements in each tyre as a function of the measured sizes of said tyre;

applying the noise reducing elements to a radially inner surface of said tyre according to the orientation set;

wherein applying comprises: arranging the noise reducing elements with the larger dimension directed in a circumferential direction or arranging the noise reducing elements with the larger dimension directed in an axial direction with respect to said tyre.

According to a further different aspect, the present invention relates to a plurality of tyres for vehicle wheels, wherein at least one of said tyres has sizes different from the other tyres;

said plurality of tyres comprising a plurality of noise reducing elements, wherein said noise reducing elements have all the same shape and have all in plan substantially a same larger dimension and a same smaller dimension;

wherein the noise reducing elements are applied to radially inner surfaces of the tyres of said plurality;

wherein the noise reducing elements of said at least one of the tyres of said plurality have the larger dimensions directed in a circumferential direction and the noise reducing elements of the other tyres of said plurality have the larger dimensions directed in an axial direction.

The Applicant found that the present invention improves the efficiency of the process of application of the noise reducing elements and thus the entire tyre manufacturing process.

Moreover, the present invention simplifies the procurement and management logistics of the noise reducing elements, since they can be arranged so as to all be the same according to a predefined specification.

The apparatus of application of the noise reducing elements and therefore also the entire tyre making plant are simpler and more reliable.

The Applicant indeed verified that the present invention allows making the size of different tyres in a single batch, being made in a plant, independent of the size of the noise reducing elements.

The present invention, in at least one of the above aspects thereof, can exhibit one or more of the following preferred features.

Preferably, the noise reducing element comprises a soundproofing material, preferably a polymeric foam, preferably polyurethane foam, preferably open cell.

Preferably, the soundproofing material has a density of between about 5 kg/m$^3$ and about 60 kg/m$^3$.

Preferably, the noise reducing element is a parallelepiped having a larger dimension, a smaller dimension and a thickness. Preferably, the noise reducing element has the shape of a tile. Preferably, the noise reducing element has a rectangular shape in plane view.

Preferably, the noise reducing element has a larger dimension of between about 150 mm and about 200 mm, more preferably equal to about 160 mm. Preferably, the noise reducing element has a smaller dimension of between about 100 mm and about 160 mm, more preferably equal to about 120 mm. Preferably, the noise reducing element has a thickness of between about 10 mm and about 50 mm, more preferably equal to about 30 mm.

Such noise reducing elements have a good noise attenuation capacity; they can be easily attached to the tyre liner by gluing them with an adhesive; once glued, they do not deteriorate and do not detach when subjected to the deformation cycles of the tyre rolling on the road; moreover, they maintain the tyre performance substantially unchanged.

Preferably, it is provided to take the measures of the tyre, preferably the maximum section width, and then orienting the noise reducing elements.

Preferably, the noise reducing elements are glued to the radially inner surface of the tyre.

Preferably, in each tyre, the noise reducing elements are arranged one after the other along a circumferential portion placed at a tread band of the tyre.

Preferably, in each tyre, the noise reducing elements are arranged all in the same way (with the larger dimension directed in a circumferential direction or with the larger dimension directed in an axial direction).

Preferably, it is provided to orient the noise reducing elements as a function of a width of the tread band.

Preferably, it is provided to orient the noise reducing elements as a function of a ratio between a width of the tread band and a larger dimension of the noise reducing elements.

Preferably, if the ratio of the width of the tread band to the larger dimension is smaller than a predefined value, orienting comprises: arranging the noise reducing elements with the larger dimension directed in a circumferential direction.

Preferably, if the ratio of the width of the tread band to the larger dimension is greater than a predefined value, orienting comprises: arranging the noise reducing elements with the larger dimension directed in an axial direction.

Preferably, said predefined value of the ratio of the width of the tread band to the larger dimension is greater than about 1.

By "width" of the tread band it is meant the width of the development of the tread band itself on a plane perpendicular to the equatorial plane of the tyre and tangential to the maximum diameter of the tyre measured when the tyre is inflated to the nominal working pressure.

If the larger dimension of the noise reducing element is such that said noise reducing element may interfere (thus affecting the integrity of the noise reducing element itself) with parts of the tyre, such as the sidewalls, in rolling on the road, then the noise reducing elements are oriented and applied with the larger dimension thereof directed in a circumferential direction. Conversely, if the larger dimension of the noise reducing element is such that said noise reducing element is not likely to contact other parts of the tyre, then the noise reducing elements are oriented and applied with the larger dimension thereof directed in an axial direction.

Preferably, it is provided to orient the noise reducing elements as a function of a maximum section width of the tyre.

Preferably, it is provided to orient the noise reducing elements as a function of a ratio between a maximum section width of the tyre and the larger dimension of the noise reducing elements.

Preferably, if the ratio of the maximum section width to the larger dimension is smaller than a predefined value, orienting comprises: arranging the noise reducing elements with the larger dimension directed in a circumferential direction.

Preferably, if the ratio of the maximum section width to the larger dimension is greater than a predefined value, orienting comprises: arranging the noise reducing elements with the larger dimension directed in an axial direction.

Preferably, said predefined value of the ratio of the maximum section width of the tyre to the larger dimension is of about 1.2 and 2, preferably equal to about 1.5.

The radially inner surface of the tyre placed at the tread band and adapted to receive the noise reducing elements has an axial extension correlated to the maximum section width. Therefore, if the maximum section width is such that the radially inner surface of the tyre placed at the tread band is able to receive the noise reducing element with the larger dimension thereof oriented axially, then the noise reducing elements are arranged with the larger dimension directed in axial direction, otherwise the noise reducing elements are arranged with the larger dimension directed in a circumferential direction.

Preferably, the circumferential coverage of the noise reducing elements, defined as the percentage ratio between the sum of the lengths of inner circumference portions of the tyre covered by the noise reducing elements and the inner circumference of the tyre defined along the equatorial plane, is between about 70% and about 100%.

Preferably, the tyres of said plurality have all sizes, preferably compared to the sizes of the noise reducing elements, falling within predefined intervals, so as to physically place the noise reducing elements therein and maximise the soundproofing effect of said noise reducing elements. In other words, once the shape and size of the noise reducing elements used has been established (in terms of larger dimension, smaller dimension and thickness), they are inserted in different tyres but still falling in a single class defined by the above predefined ranges.

Preferably, the tyre dimension that defines the ranges is the maximum section width.

Preferably, the tyres of said plurality have all a ratio between a maximum section width and a smaller dimension of the noise reducing elements greater than a predefined value.

Preferably, said predefined value of the ratio between the maximum section width and the smaller dimension of the noise reducing elements is greater than 1.2.

Preferably, the tyres of said plurality have all a ratio between a width of the tread band and a smaller dimension of the noise reducing elements greater than about 1.

Below these predefined values, the integrity of the noise reducing elements may be compromised during the rolling of the tyre.

Preferably, the tyres of said plurality have all a ratio between a maximum section width and a larger dimension of the noise reducing elements smaller than a predefined value.

Preferably, said predefined value of the ratio between the maximum section width and the larger dimension of the noise reducing elements is less than 1.5.

Preferably, the tyres of said plurality have all a ratio between a width of the tread band and a larger dimension of the noise reducing elements smaller than about 1.5.

Above these predefined values, the noise reducing elements may be too small and therefore they may not be able to perform an effective noise reduction on a substantial part of batches of manufactured tyres.

Preferably, a number of noise reducing elements is applied in each tyre that is a function of an inner diameter of the radially inner surface of said tyre.

Preferably, in each tyre, the noise reducing elements are applied with a circumferential distance from one another that is a function of an inner diameter of the radially inner surface of said tyre.

In order to obtain the desired noise reduction, the number and/or the mutual distance of the noise reducing elements applied in a tyre are also adjusted according to the circumferential development (and therefore the inner diameter) of the radially inner surface of said tyre. As the inner diameter increases, the noise reducing elements are initially mutually spaced apart and then others are added.

Preferably, the noise reducing elements are all equally oriented on the predefined path.

Preferably, the noise reducing elements are all oriented on the predefined path with the smaller dimensions thereof mutually parallel and facing each other. The larger dimensions are thus aligned with the predefined path.

Alternatively, the noise reducing elements are all oriented on the predefined path with the larger dimensions thereof mutually parallel and facing each other. The smaller dimensions are thus aligned with the predefined path.

Preferably, picking up comprises: picking up a single noise reducing element at a time. Preferably, applying comprises: applying a single noise reducing element at a time. At each step, one noise reducing element is picked up from the predefined path and applied to the tyre.

In one variant, picking up comprises: picking up at least two noise reducing elements at a time. Preferably, applying comprises: applying at least two noise reducing elements at a time. At each step, two noise reducing elements are picked up from the predefined path and applied to the tyre.

After picking up and before applying, it is provided to translate the noise reducing element(s) picked up. Optionally, after picking up and before applying, it is provided to rotate the noise reducing element(s) picked up. Preferably, the noise reducing element(s) is/are rotated on itself/themselves around an axis perpendicular to the profile in plan of the noise reducing elements. Preferably, the noise reducing element(s) is/are rotated by 90° around such an axis.

The noise reducing element(s) is/are in this way moved into space, preferably during the route between the predefined path and the tyre, so as to orient said noise reducing elements as a function of the sizes of the tyre on which they are applied.

Preferably, the picking up and application device is a multi-axis device. Preferably, the picking up and application device is a robot arm, preferably with four, five or six axes, preferably anthropomorphic. Preferably, the picking up and application head is carried at an end of the robot arm. The picking up and application device therefore is very versatile and is able to move the picking up and application head thereof along any trajectory and carry it in any position.

Preferably, the picking up and application head comprises a gripping surface having a length and a width smaller than said length. Preferably, the gripping surface is configured to receive, retain and release at least one of the noise reducing elements at a time.

Preferably, the gripping surface has openings operatively connected to a suction device configured to retain the noise reducing element(s) by suction on said gripping surface. The gripping surface is configured to engage with a first side of the noise reducing element(s) opposed to a second side of the noise reducing element(s) lying resting the predetermined path defined by the conveyor.

In addition or as an alternative to suction, retaining the noise reducing element(s) may be achieved by means of one or more mechanical crimping elements.

Preferably, the gripping surface is convex. Preferably, the gripping surface has a radius of curvature. Preferably, the gripping surface is a cylindrical portion.

Preferably, the radius of curvature of the gripping surface is of between about 80% and about 120% of a radius of the radially inner surface of the tyre.

The shape of the gripping surface and of the noise reducing element which adheres to the same substantially reflects the curvature of the radially inner surface of the tyre and facilitates the coupling of the noise reducing element to said tyre.

Preferably, the gripping surface has a rectangular profile in plan with a length and a width. Preferably, the curvature of the gripping surface develops along the length of said gripping surface.

Preferably, a length of the gripping surface is about equal to or slightly larger than the larger dimension of the noise reducing elements. Preferably, the length of the gripping surface is of between about 100% and about 130% of the larger dimension of the noise reducing elements. For example, if the larger dimension is 160 mm, the length of the gripping surface is of between about 160 mm and about 208 mm. In this case, preferably, the gripping surface picks up one noise reducing element at a time with the larger dimension thereof parallel to the length of said gripping surface.

Preferably, a length of the gripping surface is about equal to or slightly larger than twice the smaller dimension of the noise reducing elements. Preferably, the length of the gripping surface is of between about 100% and about 130% of twice the smaller dimension. For example, if the smaller dimension is 120 mm, the length of the gripping surface is of between about 240 mm and about 312 mm. In this case, preferably, the gripping surface picks up two noise reducing elements at a time with the larger dimensions thereof parallel to the width of said gripping surface.

Preferably, a width of the gripping surface is about equal to the smaller dimension of the noise reducing elements. Preferably, the width of the gripping surface is of between about 100% and about 130% of the smaller dimension of the noise reducing elements. For example, if the smaller dimension is 120 mm, the width of the gripping surface is of between about 120 mm and about 156 mm.

Preferably, the control unit is configured to process the sizes of each tyre and set the orientation of the noise reducing elements in each tyre as a function of the sizes of said tyre.

Preferably, the control unit is configured to drive the picking up and application device according to the following steps:
  placing the gripping surface of the picking up and application head in contact with a first side of at least one noise reducing element resting on the conveyor;
  activating a suction device for adhering said first side to the gripping surface.

Preferably, the control unit is configured to drive the picking up and application device according to the following steps:
  moving the picking up and application head with said at least one noise reducing element inside a tyre and facing a radially inner surface of said tyre;
  contacting and adhering the second side of said at least one noise reducing element carried by the picking up and application head to the radially inner surface of the tyre.

Preferably, moving the picking up and application head with said at least one noise reducing element inside a tyre comprises: translating and/or rotating the picking up and application head so as to orient said at least one noise reducing element carried by it.

Preferably, when the picking up and application head faces the radially inner surface, a length of the gripping surface is parallel to the axis of rotation of the tyre.

Alternately, when the picking up and application head faces the radially inner surface, a width of the gripping surface is parallel to the axis of rotation of the tyre. Preferably, contacting and adhering comprises: pressing the picking up and application head against the radially inner surface of the tyre.

Preferably, pressing comprises: radially moving the picking up and application head against the radially inner surface of the tyre.

Preferably, pressing comprises: oscillating the application head to first apply one end of the noise reducing element and then the remaining part of said noise reducing element.

Preferably, the apparatus for applying noise reducing elements to tyres for vehicle wheels comprises a glue deposition device configured to apply a layer of glue on a second side of the noise reducing elements opposed to a first side intended to come into contact with the gripping surface. Preferably, the glue deposition device is located upstream of the application station.

Further features and advantages will become more apparent from the detailed description of a preferred but non-exclusive embodiment of an apparatus and a method for applying noise reducing elements to tyres for vehicle wheels in a plant and a process for manufacturing tyres for vehicle wheels according to the present invention.

DESCRIPTION OF THE DRAWINGS

Such description is given hereinafter with reference to the accompanying drawings, provided only for illustrative and, therefore, non-limiting purposes, in which.

DETAILED DESCRIPTION

Figure 1:
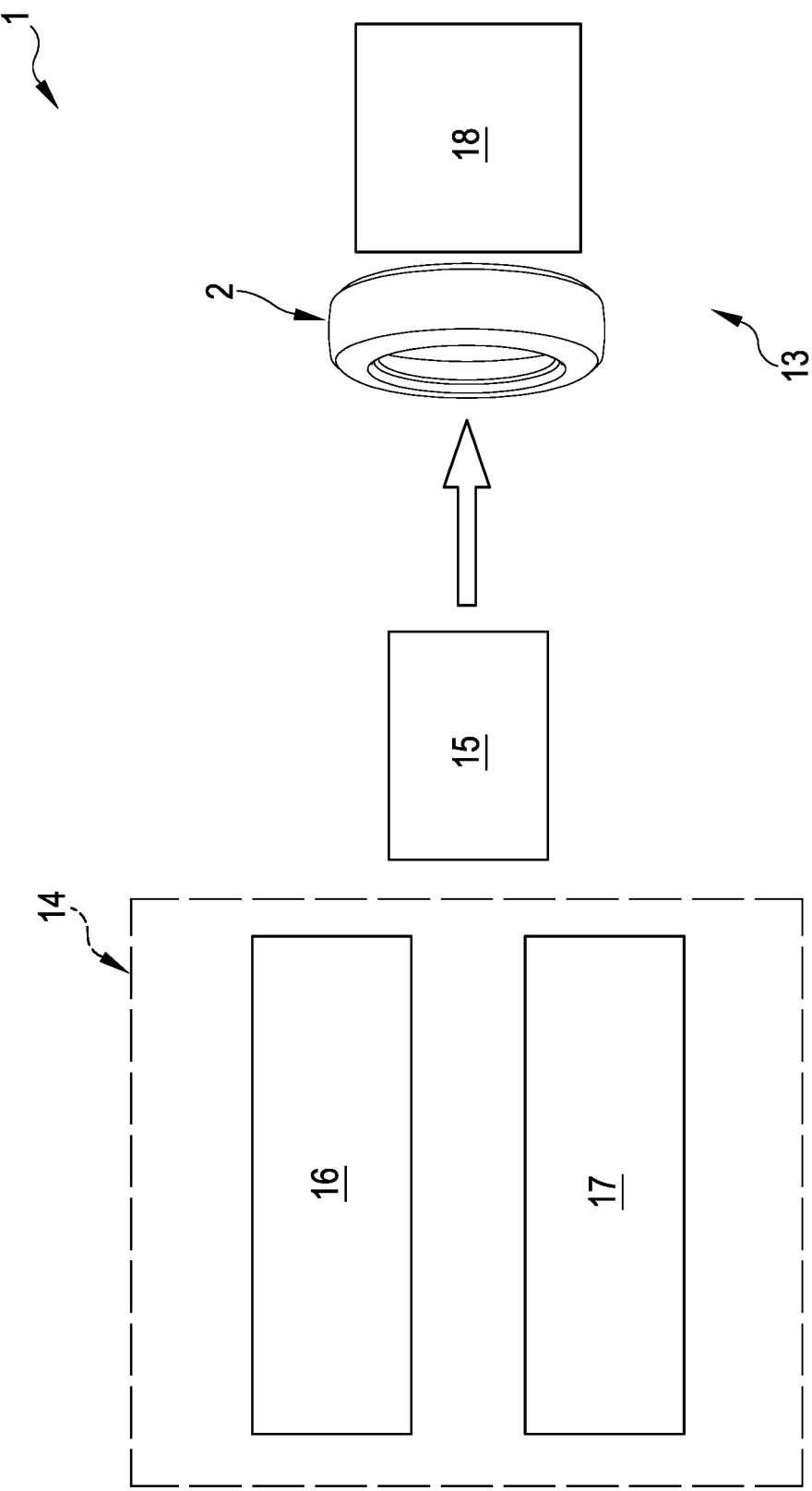
FIG. 1 schematically shows a plant for making tyres for vehicle wheels comprising an apparatus for applying noise reducing elements to tyres for vehicle wheels according to the present invention.

With reference to FIG. 1, reference numeral 1 identifies as a whole a plant for making tyres 2 for vehicle wheels.

Figure 4:
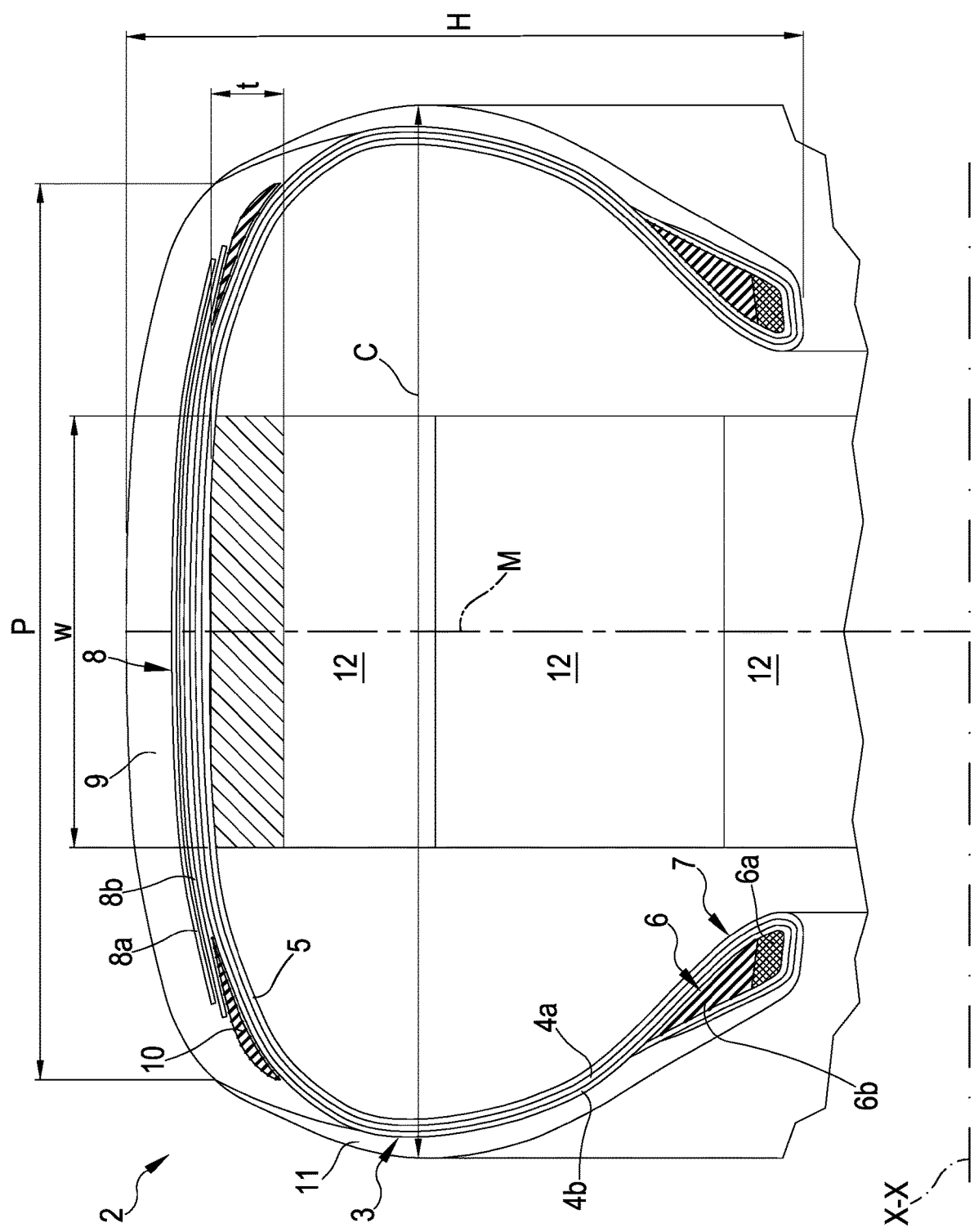
FIG. 4 shows a radial half-section of a tyre made with the plant in FIG. 1.

A tyre 2, made in said plant 1, is shown in FIG. 4 and essentially comprises a carcass structure 3 having two carcass plies 4a, 4b. An airtight layer of elastomeric material or so-called liner 5 is applied internally to the carcass ply/plies 4a, 4b. Two annular anchoring structures 6 comprising each a so-called bead core 6a bearing an elastomeric filler 6b in radially outer position are engaged to respective end flaps of the carcass ply or plies 4a, 4b. The annular anchoring structures 6 are integrated in the proximity of zones usually identified by the name of "beads" 7, at which the engagement between tyre 2 and a respective mounting rim usually occurs. A belt structure 8 comprising belt layers 8a, 8b is circumferentially applied around the carcass ply/plies 4a, 4b, and a tread band 9 is circumferentially overlapped to the belt structure 8. The belt structure 8 can be associated with so-called "under-belt inserts" 10 placed each between the carcass ply/plies 4a, 4b and one of the axially opposite end edges of the belt structure 8. Two sidewalls 11, extending each from the respective bead 7 to a corresponding lateral edge of the tread band 9, are applied in laterally opposite positions on the carcass plies 4a, 4b.

Tyre 2 has (FIG. 4), a maximum section width "C" defined by the maximum width of the cross-section of tyre 2 measured parallel to an axis of rotation "X-X" of the same and placed at sidewalls 11. Tyre 2 has (FIG. 4) a sectional height "H" defined as the distance measured along a radial direction between bead 7 and a radially outermost portion of the tread band 9. Tyre 2 has a width "P" of the tread band 9 measured in a plane perpendicular to the equatorial plane of tyre 2 and tangent to the maximum diameter of tyre 2 when tyre 2 is inflated to the working pressure (i.e. measured along an axial direction).

Tyre 2 further comprises noise reducing elements 12 shaped as tiles, coupled to a radially inner surface of tyre 2 located at the tread band 9.

The noise reducing elements 12 are placed astride of a middle plane "M" of tyre 2 and are arranged sequentially side by side, or slightly spaced apart, along the circumferential extension of tyre 2 itself (FIGS. 4 and 6-9), in a number depending on the size of tyre 2.

Such noise reducing elements 12 are made of a soundproofing material, i.e. able to dampen or cancel the noise generated by rolling, such as a polymeric foam, preferably of an open cell material, more preferably of polyurethane foam. The soundproofing material has a density of for example about 40 kg/m$^3$. Their function is to attenuate the noise produced by tyre 2 itself during use.

Plant 1 shown in FIG. 1 comprises a production line 13 of tyres 2 consisting of a manufacturing apparatus 14 of green tyres 2 and at least one moulding and vulcanisation unit 15 operatively arranged downstream of the manufacturing apparatus 14.

In the non-limiting embodiment of plant 1 shown in FIG. 1, the manufacturing apparatus 14 comprises a carcass manufacturing line 16 at which forming drums, not shown, are moved between different stations of dispensing semi-finished products designed to form, on each manufacturing drum, a carcass sleeve comprising the carcass plies 4a, 4b, liner 5, the annular anchoring structures and possibly at least part of sidewalls 11.

At the same time, in an outer sleeve manufacturing line 17, one or more auxiliary drums, not shown, are sequentially moved between different work stations designed to form an outer sleeve on each auxiliary drum, comprising at least the belt structure 8, the tread band 9, and possibly at least part of sidewalls 11.

The manufacturing apparatus 14 further comprises an assembling station, not shown, at which the outer sleeve is coupled to the carcass sleeve.

In other embodiments of plant 1, not shown, the manufacturing apparatus 14 may be of different type, for example designed to form all of the above components on a single drum by means of manufacturing devices.

The manufactured tyres 2 are then transferred to the moulding and vulcanisation unit 15.

As shown in FIG. 1, an apparatus 18 for applying noise reducer elements 12 to tyres 2 is operatively located downstream of the moulding and vulcanisation unit 15.

The moulded and vulcanised tyres 2 are moved, by suitable devices not shown, from the moulding and vulcanisation unit 15 into apparatus 18 for applying noise reducer elements 12.

Tyres 2 coming from the moulding and vulcanisation unit 15 (and thus from the manufacturing apparatus 14) and arriving in apparatus 18 for applying noise reducing elements 12 are not all identical but have different sizes. For example, tyres 2 arrive in apparatus 18 for applying noise reducing elements 12, wherein tyres 2 in one group have the same sizes and tyres 2 in different groups have different sizes.

Apparatus 18 comprises (FIG. 2) a conveyor 19, such as a conveyor belt or a motorised roller, for feeding tyres 2 coming from the moulding and vulcanisation unit 15. Conveyor 19 is sized to support and carry tyres 2 of different sizes (in particular, maximum diameter and section width), for the reasons that will be described hereinafter.

Apparatus 18 comprises (FIGS. 2 and 3) a conveyor 20 that develops along a predetermined path. Conveyor 20 is configured for supporting and advancing in a sequence and in a predefined direction "D" a plurality of noise reducing elements 12 arranged in a row and coming from a feeder, not shown.

Conveyor 20 comprises a first conveyor 21 having a first upper transport surface 22 configured for supporting the noise reducing elements 12 coming from the feeder.

Figure 5:
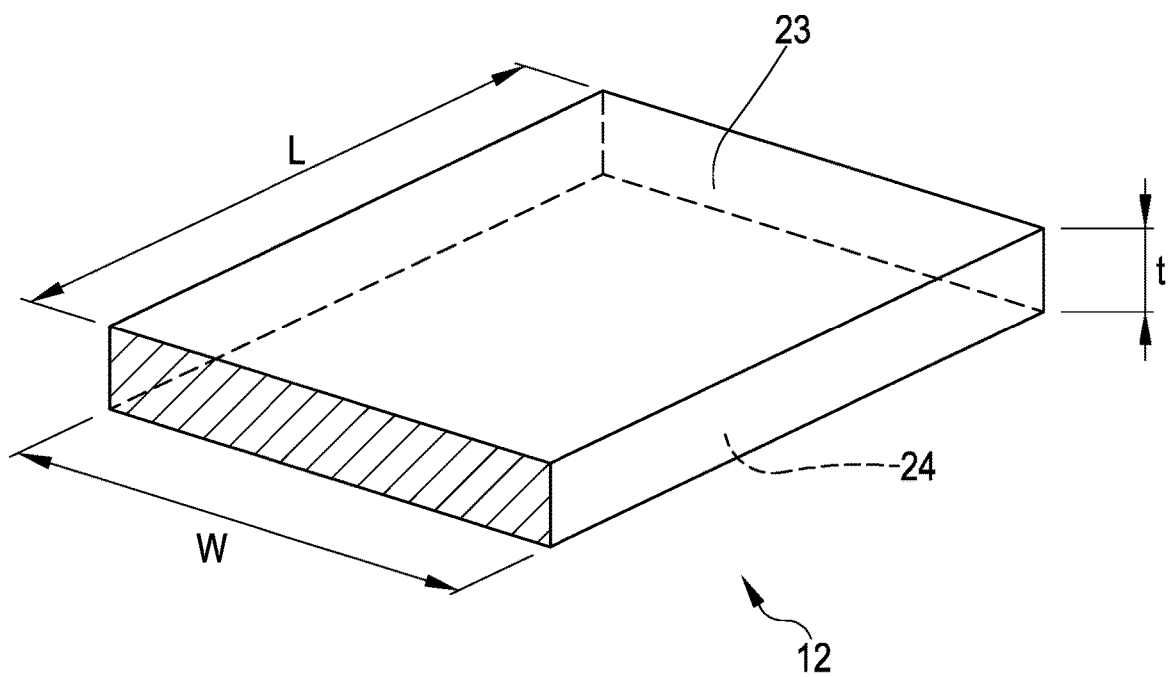
FIG. 5 shows a perspective view of a noise reducing element configured for being installed in the tyre in FIG. 8.

As shown in FIG. 5, each noise reducing element 12 is a parallelepiped having the profile of a tile with a rectangular plan shape. The noise reducing element 12 has a first side 23 and a second side 24 opposite the first 23. The noise reducing element 12 has a larger dimension "L", for example equal to about 160 mm, a smaller dimension "W", for example equal to about 120 mm, and a thickness "t", for example equal to about 30 mm.

Figure 2:
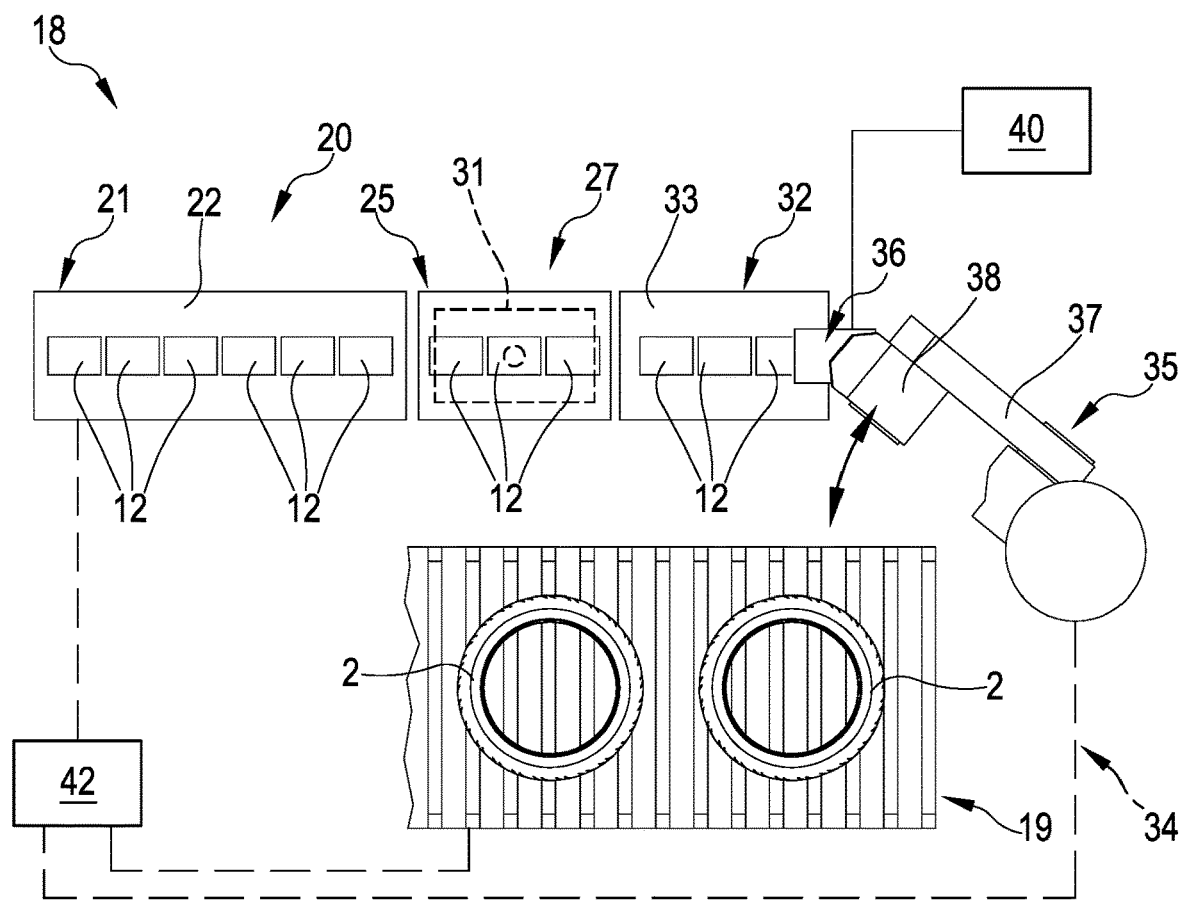
FIG. 2 shows a detailed top view of the apparatus for applying noise reducing elements in FIG. 1.
Figure 3:
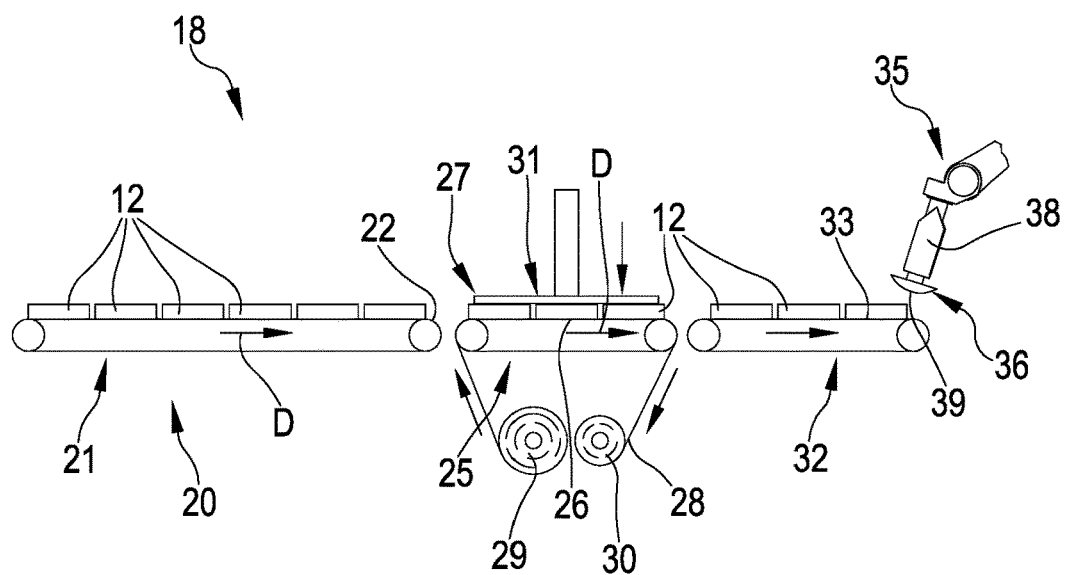
FIG. 3 shows a lateral elevation view of the apparatus in FIG. 2.

As shown in FIGS. 2 and 3, the noise reducing elements 12 are fed in a row with the second sides 24 thereof resting on the first upper transport surface 22 thereof and with the first sides 23 thereof facing upwards.

In FIGS. 2 and 3, all the noise reducing elements 12 are oriented on the predefined path with the smaller dimensions "W" thereof mutually parallel and facing each other. The larger dimensions "L" are thus aligned with the predefined path. In an embodiment variant, shown in FIGS. 11 and 12, the noise reducing elements are fed on the predefined path with the larger dimensions "L" thereof mutually parallel and facing each other. In this case, the smaller dimensions "W" are thus aligned with the predefined path.

Conveyor 20 comprises a second conveyor 25 having a second upper transport surface 26 and operatively associated to a glue deposition device 27. The second conveyor 25 with the glue deposition device 27 are located downstream of the first conveyor 21 with respect to the predefined direction "D".

The glue deposition device 27 comprises a support film 28 bearing a layer of glue, not shown, and wrapped in a first reel 29 and placed below the second conveyor 27. The support film 29, unwrapped from the first reel, 29, passes in support on the second upper transport surface 26 with the layer of glue facing upwards and is then wrapped in a second reel 30, also located below the second conveyor 27.

The stretch of support film 29 that rests on the second upper transport surface 26 moves along with said second upper transport surface 26 in the predefined direction "D".

The glue deposition device 27 comprises a plate 31 moved by an actuator, not shown. Plate 31 is placed above the second conveyor 25 and is facing towards the second upper transport surface 26. The actuator is configured to move plate 31 from a raised position, in which it lies space apart from the second upper transport surface 26, and a lowered position in which it is carried at said second upper transport surface 26. Plate 31 in the lowered position presses the noise reducing elements 12 coming from the first conveyor 21 and rest on the layer of glue of the support film 28 against said layer of glue so as to cause the passage of the glue from the support film 28 to the second side 24 of each noise reducing element 12.

Downstream of the second conveyor 25 and of the glue deposition device 27 is a third conveyor 32 having a third upper transport surface 33 moving in the predefined direction "D". The noise reducing elements 12 coming from the second conveyor 25 and carried by the third conveyor 32 are provided with the glue arranged on the second side 24 thereof. The support film 28 wrapped in the second reel 30 is at least partially devoid of the layer of glue.

The first, second and third conveyor 21, 25, 32 are each defined by a conveyor belt wound on respective motorised rollers.

The third conveyor 32 is positioned at an application station 34 (FIG. 2) defined by an end portion of conveyor 19.

In the application station 34 is arranged a picking up and application device 35 comprising a picking up and application head 36 (FIGS. 2 and 3). The picking up and application head 36 is movable between conveyor 20 and the application station 34 for picking up at least one noise reducing element 12 at a time and applying it on a radially inner surface of tyre 2 placed in the application station 34. In the non-limiting embodiment shown, the picking up and application device 35 is an anthropomorphic multi-axis robot arm and the picking up and application head 36 is carried at a terminal end of the anthropomorphic robot arm 35. The anthropomorphic robot arm 35 comprises a plurality of elements 37, 38 consecutively arranged and connected together by rotatable joints. The picking up and application head 36 is connected to an end element 38 and can rotate with respect to said end element 38 around, for example, a first articulation axis "k" and a second articulation axis "j" (FIG. 10).

The picking up and application head 36 has a gripping surface 39 configured to receive, retain and release at least one of the noise reducing elements 12 at a time. In the embodiment shown, the gripping surface 39 has the shape of a convex cylindrical portion (FIGS. 3, 6, 8 and 10) similar to an ink pad. In particular, the gripping surface 39 is a portion of a cylindrical revolution surface with a circle as a directrix.

The gripping surface 39 has a rectangular plan profile with a width "A" aligned to a generatrix of the cylindrical surface and a length "B" (greater than width "A") measured along the arched development.

Figures 6, 7:
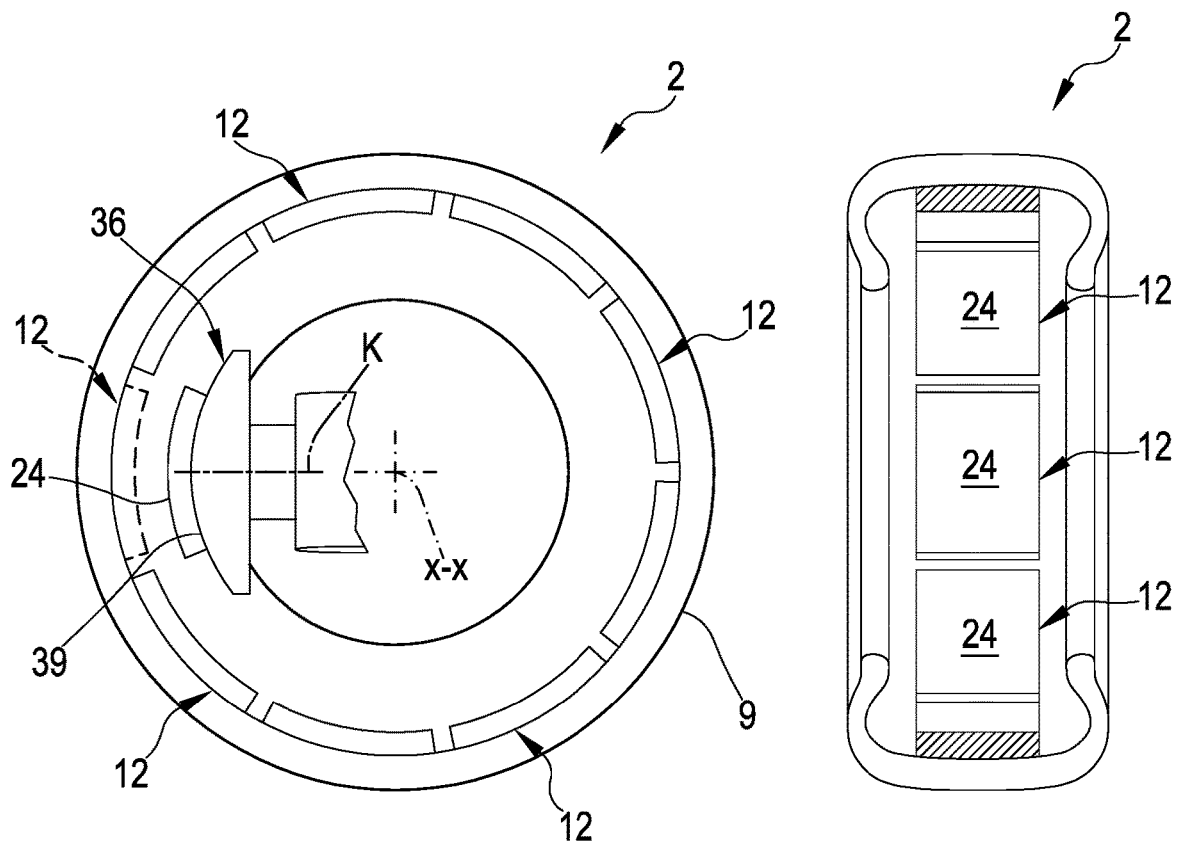
FIG. 6 shows the tyre in FIG. 4 dissected along a centreline plane and a picking up and application head of the apparatus in FIGS. 2 and 3 operatively associated with the tyre.
FIG. 7 shows the tyre in FIG. 6 dissected along a radial plane.
Figures 8, 9:
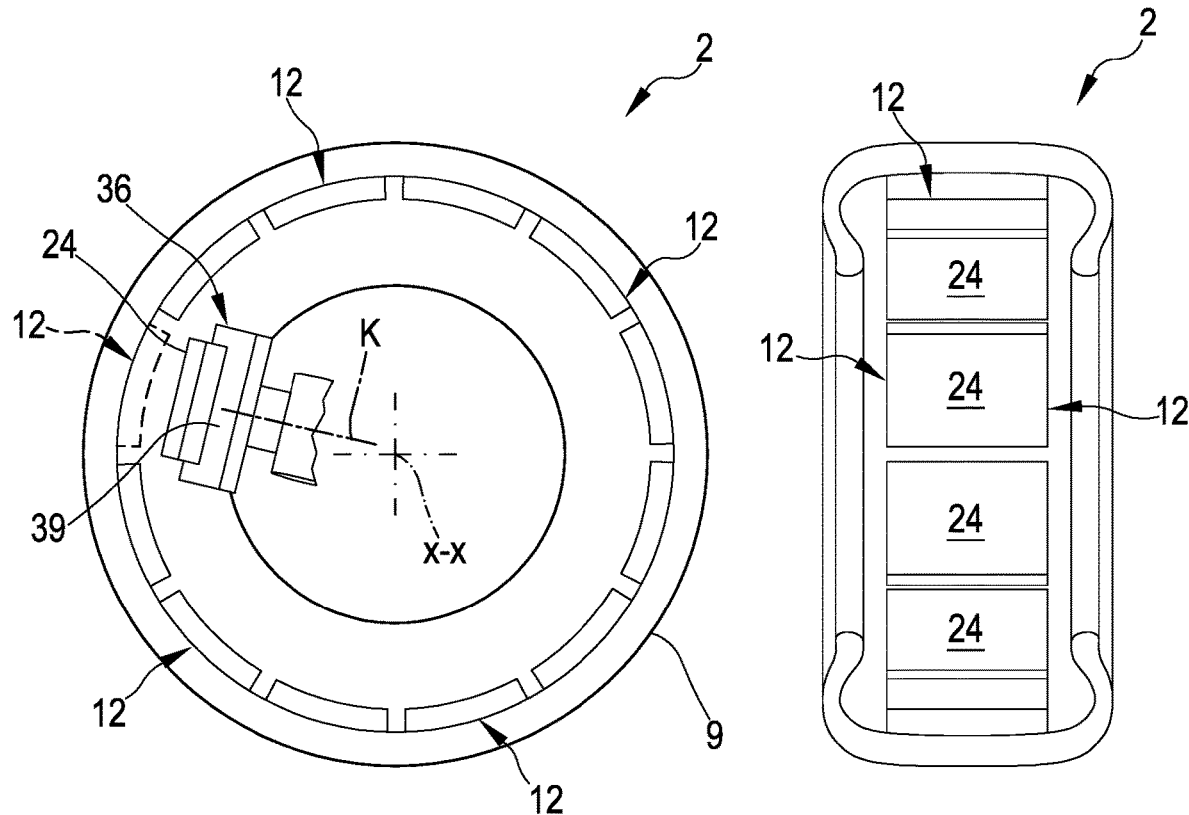
FIG. 8 shows a variant of the tyre in FIG. 4 dissected along a centreline plane and the picking up and application head of the apparatus in FIGS. 2 and 3 operatively associated with the tyre.
FIG. 9 shows the tyre in FIG. 8 dissected along a radial plane.
Figure 10:
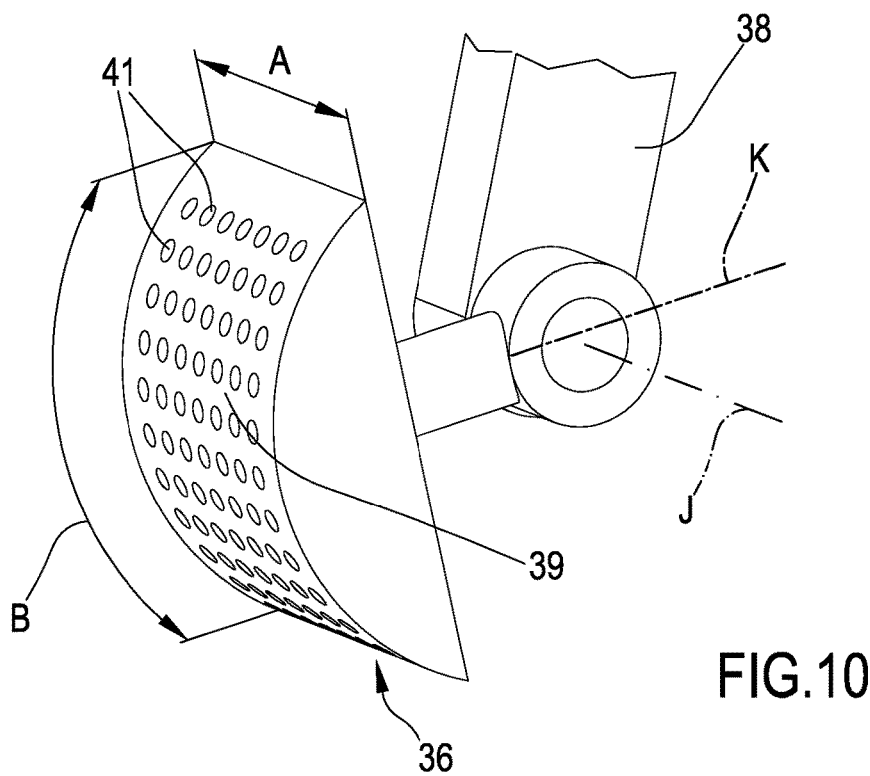
FIG. 10 schematically shows a perspective view of an element of the apparatus in FIGS. 6 and 8.

In the embodiment shown in FIGS. 6, 8 and 10, length "B" is slightly greater than the larger dimension "L" of the noise reducing elements 12 (see FIG. 6). For example, such a length "B" is about 110% of the larger dimension "L". If the larger dimension "L" is 160 mm, then length "B" is about 176 mm. In the embodiment shown in FIGS. 6, 8 and 10, width "A" is slightly greater than the smaller dimension "W" of the noise reducing elements 12 (see FIG. 8). For example, such a width "A" is about 110% of the smaller dimension "W". If the smaller dimension "W" is 120 mm, then width "A" is about 122 mm.

The radius of curvature of the gripping surface 39, i.e. the radius of the circle/generatrix of the cylindrical surface, is for example between about 80% and about 120% of a radius of the radially inner surface of tyre 2 in which the noise reducing elements are applied. In particular, the radius of the circle/generatrix of the cylindrical surface 39 of a picking up and application head 36 is always the same but the ratio with the radius of the radially inner surface of tyre 2 is variable since tyres 2 can have different sizes.

The picking up and application device 35 comprises a suction device 40, schematically shown in FIG. 2, which is operatively connected to the picking up and application head 36. In particular, the suction device 40 is in fluid communication, through special conduits, with openings 41 located on the gripping surface (FIG. 10). The suction device 40 is configured to retain one or more noise reducing elements 12 by suction on said gripping surface 39.

Apparatus 18 for applying noise reducing elements 12 comprises a control unit 42, schematically shown in FIG. 2, operatively connected to conveyor 20, to conveyor 19 and to the picking up and application device 35. Said control unit 42 may further be operatively connected to (or be part of) a central control unit of plant 1. The control unit 42 is configured to monitor and control conveyor 20, conveyor 19 and the picking up and application device 35.

In use and according to a process for manufacturing tyres for vehicle wheels and to a method for applying noise reducing elements to tyres for vehicle wheels, a plurality of noise reducing elements 12 all equal to each other are arranged in sequence on the first conveyor 21. The elements in the plurality are all equally oriented. By the movement of the first upper transport surface 22, the first conveyor 21 advances the noise reducing elements according to the predetermined path and in the predefined direction "D". This advancement movement is preferably carried out in steps, so as to move a certain number of noise reducing elements 12 on the second conveyor 25.

As shown in FIGS. 2 and 3, the first transport surface 22 and the second transport surface 26 advance continuously for a period of time such as to carry three noise reducing elements 12 on the second transport surface 26 and in abutment on the layer of glue of the support film 28. The first transport surface 22 and the second transport surface 26 are then stopped and plate 31 of the glue deposition device 27 is lowered up to press the three noise reducing elements 12 against the support film 28 and cause the passage of the layer of glue on the second side 24 of said noise reducing elements 12.

Once plate 31 has been raised, the first transport surface 22 and the second transport surface 26 advance again to bring the three noise reducing elements 12 provided with the glue layer on the third conveyor 32 and to bring three more noise reducing elements 12 to be glued on the second conveyor 25. The three noise reducing elements 12 with the layer of glue arrive at the application station 34.

Meanwhile, conveyor 19 feeds in succession and in steps tyres 2 towards said application station 34. One tyre 2 at a time, intended to receive the noise reducing elements, is arranged in the application station.

The control unit 42 is configured to receive data relating to each tyre 2 arriving in the application station 34. For example, apparatus 18 for applying noise reducing elements 12 comprises a sensor system, not shown, connected to the control unit 42 and operatively active at conveyor 19. The sensors are configured to directly detect the sizes (such as maximum section width "C" or width "P" of the tread band, the section height "H", etc.) of the transiting tyre 2 and/or they detect identification codes thereof located on sidewalls 11 and transmit them to the control unit 42. Alternatively, for example, such data are passed to the control unit 42 by the manufacturing apparatus 14 located upstream.

For each tyre 2 arriving in the application station 34, the control unit 42 processes the sizes of said tyre 2 and sets the orientation that the noise reducing elements 12 must take in tyre 2, the number of noise reducing elements 12 for said tyre 2 as a function of such sizes and then controls the picking up and application device 35 to pick from conveyor 23 and apply the noise reducing elements 12 to the radially inner surface of said tyre 2 according to the orientation set.

Preferably, the orientation of the noise reducing elements 12 in tyres 2 is set as a function of the maximum section width "C" of tyres 2 themselves.

For example, if tyre 2 arriving in the application station 34 has a ratio between the maximum section width "C" thereof and the larger dimension "L" of the noise reducing elements 12 smaller than a predefined value (such as about 1.5), then the orientation with which the noise reducing elements 12 are applied in tyre 2 is circumferential. In other words, the noise reducing elements 12 are applied on the radially inner surface of tyre 2 with their larger dimensions "L" directed in the circumferential direction (FIGS. 6 and 7).

More in detail, the pickup and application head 36 leans with its gripping surface 39 against the first side 23 of a single noise reducing element 12 by means of a rotational movement, in order to allow the entire gripping surface 39, which is cylindrical, to adhere to the first side 23, which is flat. Length "B" of the gripping surface 39 is oriented parallel to the greater dimension "L" of the noise reducing element 12. The suction device 40 is active, so that the noise reducing element 12 is retained on the gripping surface 39.

The robot arm 35, controlled by the control unit 42, brings the picking up and application head 36, which retains the noise reducing element 12, up within tyre 2 resting with a sidewall 11 on conveyor 19 (FIG. 6). During transport, the picking up and application head 36, with the noise reducing element 12, is translated and/or rotated so as to place it facing the radially inner surface of said tyre 2 with length "B" thereof in the circumferential direction of tyre 2 (and width "A" thereof parallel to axis "X-X" of tyre 2). As shown in FIG. 6, the picking up and application head 36 brings the noise reducing element 12 with the second side 24 facing the radially inner surface of tyre 2 and the larger dimension "L" oriented circumferentially.

The robot arm 35, controlled by the control unit 42, then provides to place in contact and glue the second side 24 (provided with the glue layer) of the noise reducing element 12 carried by the picking up and application head 36 to the radially inner surface of tyre 2. To this end, the picking up and application head 36 is pressed against the radially inner surface of tyre 2 by means of a radial and/or roto-translatory movement. In particular, if the radius of curvature of the gripping surface 39 is substantially identical to the radius of the radially inner surface of tyre 2 or is larger, then the movement is only radial. If instead the radius of curvature of the gripping surface 39 is smaller than the radius of the radially inner surface of tyre 2, then the robot arm 35 is actuated to make the gripping surface 39 perform a rotational or roto-translatory movement (about an axis parallel to the axis of rotation "X-X") so that the entire second surface 24 of the noise reducing element 12 is applied and pressed against the radially inner surface.

The robot arm 35 performs such picking up and application operations as many times as are the noise reducing elements 12 to be applied to tyre 2 and arranges said noise reducing elements 12 one after the other along a circumferential line located at the tread band 9 of tyre 2 (FIGS. 6 and 7). The noise reducing elements 12 are applied at a circumferential distance from each other depending on their number and on an inner diameter of the radially inner surface of said tyre 2. The control unit 42 provides to perform the relevant calculations and to control the robot arm 35 accordingly.

If instead tyre 2 arriving in the application station 34 has a ratio "C/L" between the maximum section width "C" thereof and the larger dimension "L" of the noise reducing elements 12 greater than said predefined value (about 1.5), then the orientation with which the noise reducing elements 12 are applied in tyre 2 is axial.

In other words, the noise reducing elements 12 are applied on the radially inner surface of tyre 2 with their larger dimensions "L" directed in the axial direction (parallel to the axis of rotation "X-X"), i.e. with the smaller dimensions "W" thereof directed in the circumferential direction (FIGS. 8 and 9).

The picking up and application head 36 picks a single noise reducing element 12 as described above but during transport, the picking up and application head 36, with the noise reducing element 12, is translated and/or rotated so as to place it facing the radially inner surface of said tyre 2 with length "B" thereof parallel to axis "X-X" of tyre 2 (and width "A" thereof directed in the circumferential direction of tyre 2). With respect to what is shown in FIGS. 6 and 7, the picking up and application head 36 and the noise reducing element 12 are rotated by 90° around the first articulation axis "k".

As shown in FIG. 8, the picking up and application head 36 brings the noise reducing element 12 with the second side 24 facing the radially inner surface of tyre 2 and the smaller dimension "W" oriented circumferentially.

The robot arm 35, controlled by the control unit 42, then provides to place in contact and glue the second side 24 (provided with the glue layer) of the noise reducing element 12 carried by the picking up and application head 36 to the radially inner surface of tyre 2. To this end, the picking up and application head 36 is pressed against the radially inner surface of tyre 2 by means of a radial movement.

Also in this case, the robot arm 35 performs the picking up and application operations as many times as are the noise reducing elements 12 to be applied to tyre 2 and arranges said noise reducing elements 12 one after the other along a circumferential line located at the tread band 9 of tyre 2 (FIGS. 8 and 9). The noise reducing elements 12 are applied at a circumferential distance from each other depending on their number and on an inner diameter of the radially inner surface of said tyre 2.

In both cases described above, the control unit 42 is preferably programmed to perform a circumferential coverage of the radially inner surface with the noise reducing elements 12 (defined as the percentage ratio between the area of the radially inner surface covered by the noise reducing elements 12 and the area of the radially inner surface of tyre 2 placed at the tread and the area) of between about 70% and about 100%.

Figure 11:
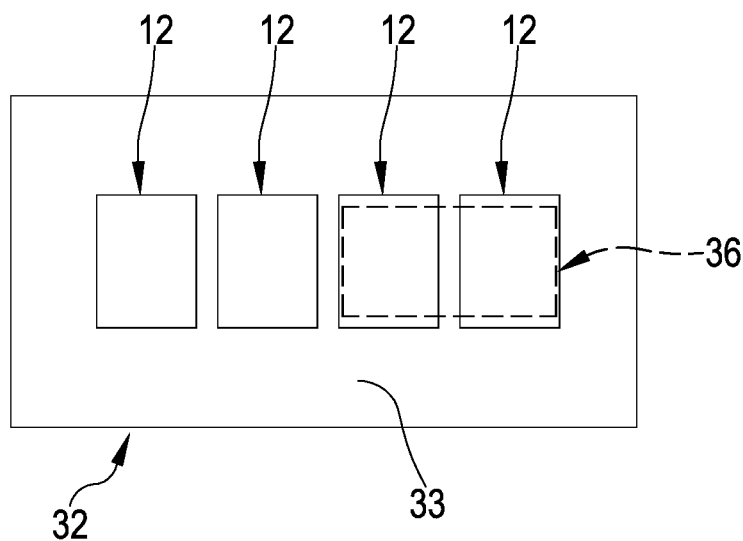
FIG. 11 shows a portion of the top view in FIG. 2 with a different arrangement of the noise reducing elements.
Figure 12:
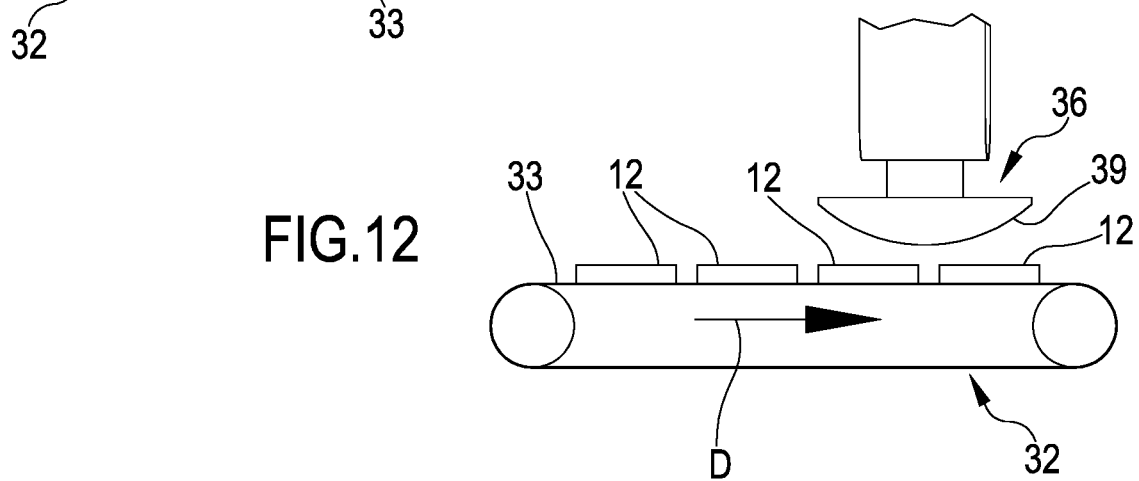
FIG. 12 shows a lateral elevation view of the portion in FIG. 11.
Figure 13:
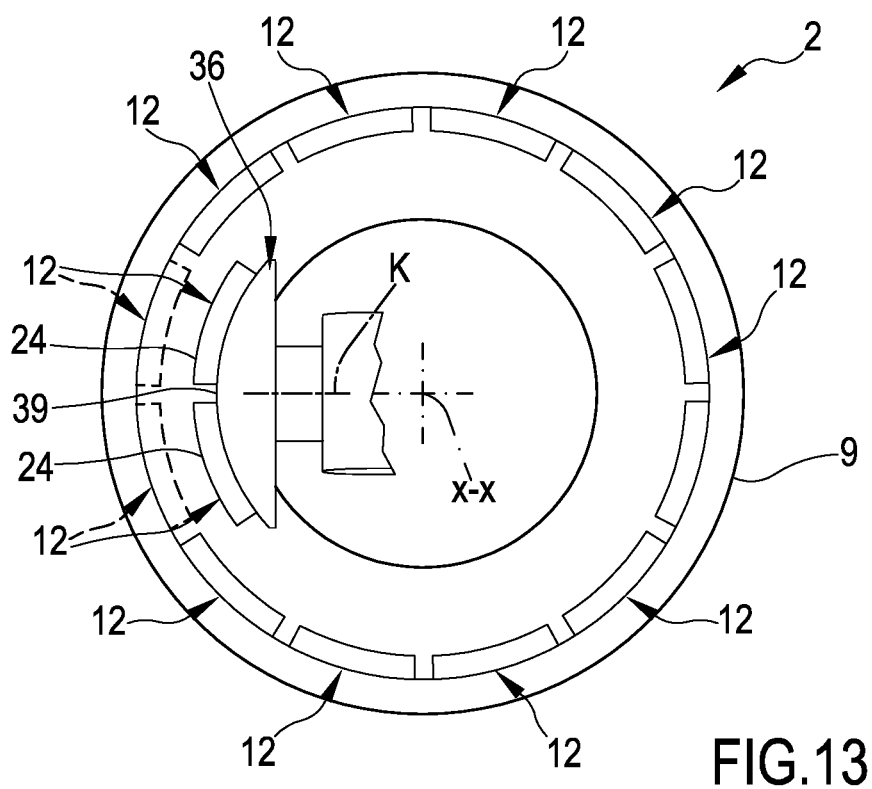
FIG. 13 shows the view in FIG. 6 with a picking up and application head of the apparatus in FIGS. 11 and 12 operatively associated with the tyre.
Figure 14:
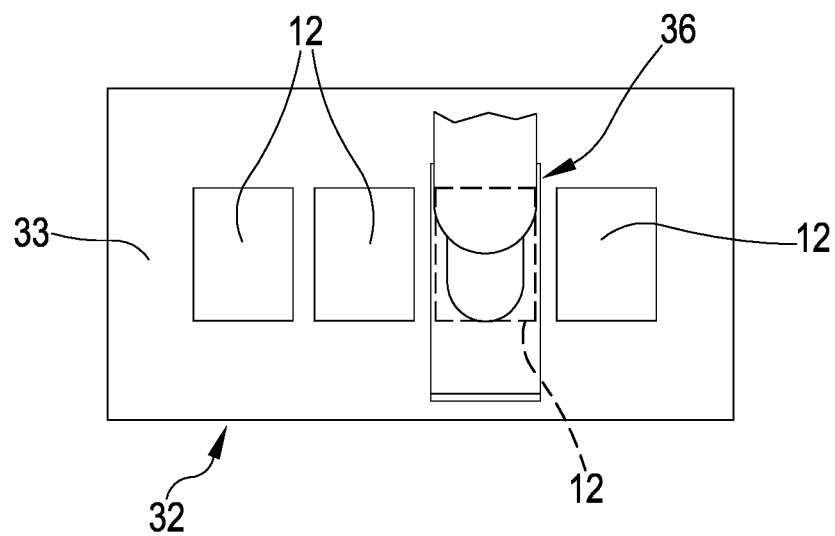
FIG. 14 shows the top view in FIG. 11 with the picking up and application head that picks up one of the noise reducing elements according to a variant of the method.
Figure 15:
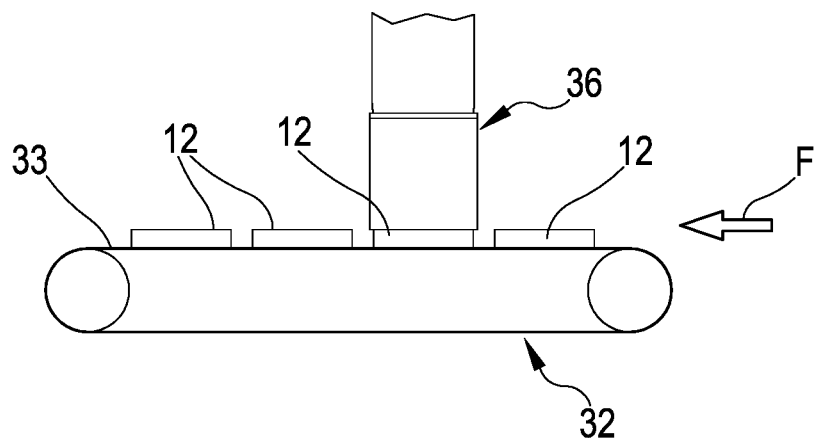
FIG. 15 shows the lateral elevation view in FIG. 14.
Figure 16:
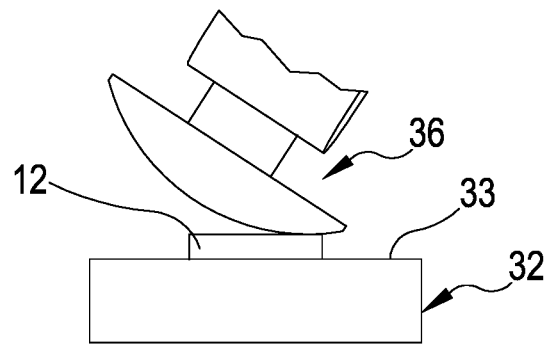
FIG. 16 shows a view according to arrow F in FIG. 15.
Figure 17:
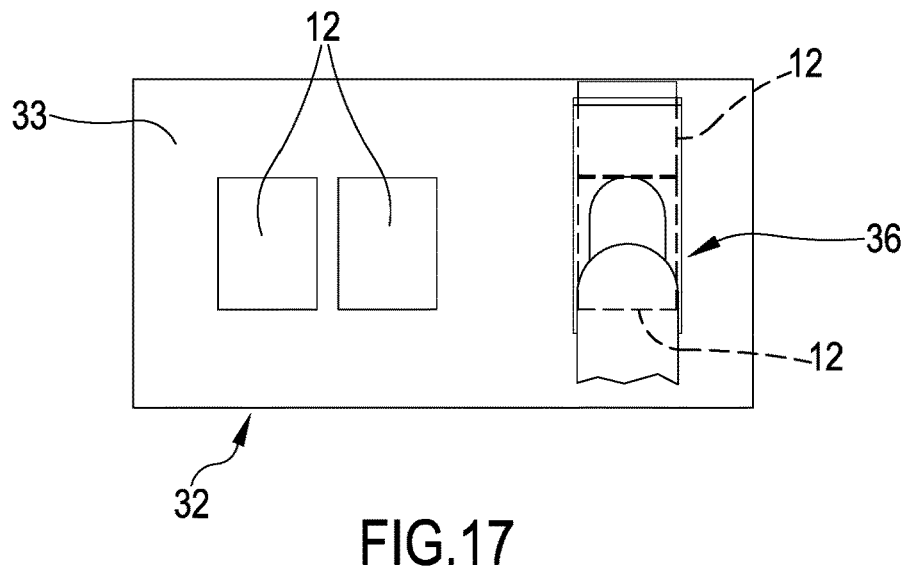
FIG. 17 shows the top view in FIG. 14 with the picking up and application head that picks up another noise reducing element.
Figure 18:
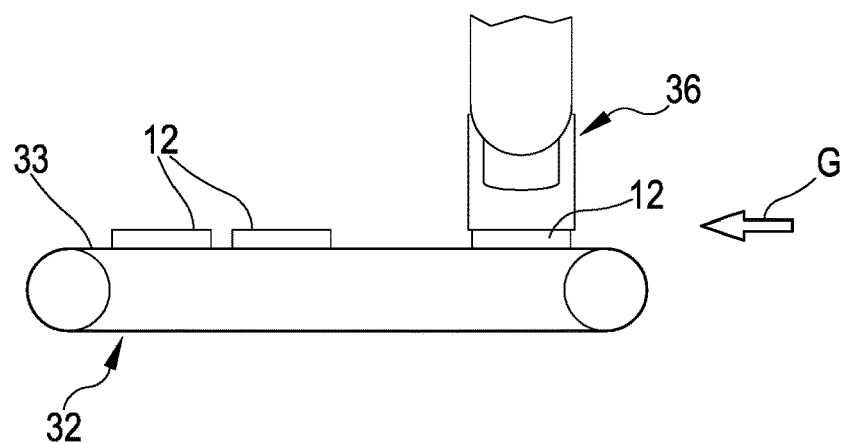
FIG. 18 shows the lateral elevation view in FIG. 17.
Figure 19:
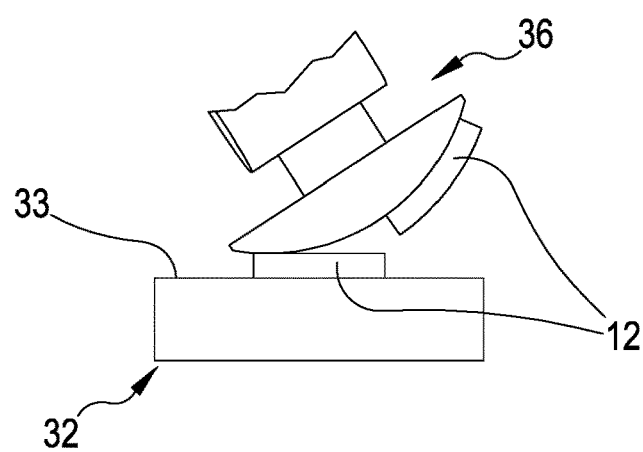
FIG. 19 shows a view according to arrow G in FIG. 18.

In the variant shown in FIGS. 11, 12 and 13, the noise reducing elements 12 are conveyed on conveyor 23 with the larger dimensions "L" thereof mutually parallel and facing each other. The picking up and application head 36 picks up two noise reducing elements 12 at a time from conveyor 23, arranging itself with length "L" thereof parallel to the predefined direction "D" and thus to the smaller dimensions "W" of said noise reducing elements 12 (FIG. 12).

The two noise reducing elements 12 are therefore retained on the gripping surface 39 with the larger dimensions "L" thereof parallel to width "A" of said gripping surface 39 and conveyed within tyre 2. In this variant, considering again noise reducing elements 12 with a larger dimension "L" equal to about 160 mm and a smaller dimension "W" equal to about 120 mm, length "B" of the gripping surface 39 is greater than twice the smaller dimension "W", and is for example equal to about 280 mm and width "A" is for example equal to about 160 mm.

As shown in FIG. 13, the picking up and application head 36 applies the two noise reducing elements 12 with the larger dimensions "L" thereof directed in the axial direction (parallel to the axis of rotation "X-X"), i.e. with the smaller dimensions "W" thereof directed in the circumferential direction. The resulting tyre 2 is substantially identical to that in FIGS. 8 and 9.

Figure 20:
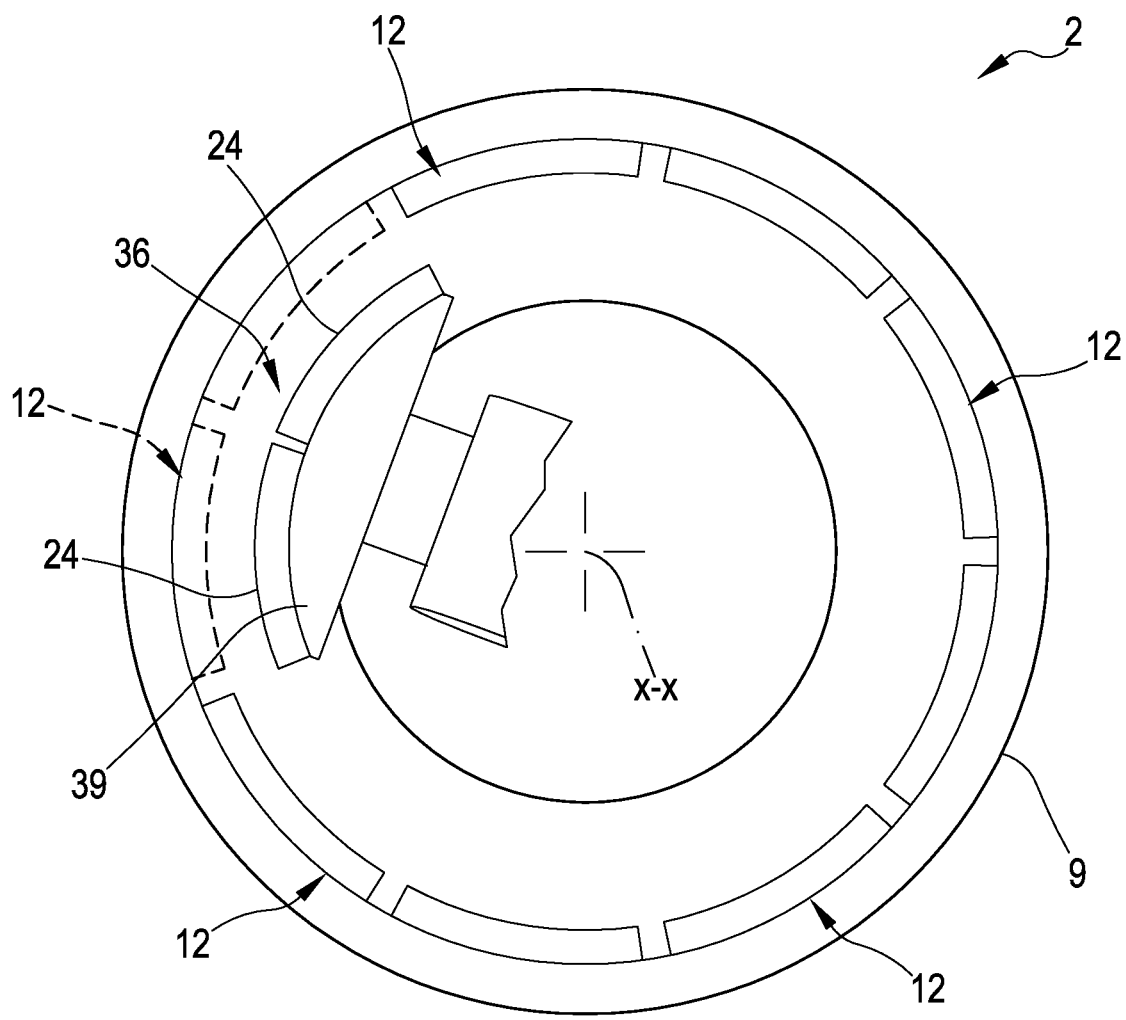
FIG. 20 shows the view in FIGS. 6 and 13 with a picking up and application head of the apparatus in FIGS. 14-19 operatively associated with the tyre.

In one variant shown in FIGS. 14 to 20, the picking up and application head 36 picks up two noise reducing elements 12 from conveyor 23, arranging itself with length "B" thereof perpendicular to the predefined direction "D" and thus to the smaller dimensions "W" of said noise reducing elements 12. As shown in FIGS. 14-20, the picking up and application head 36 with reciprocal displacement with respect to the noise reducing elements first picks up a noise reducing element 12 (FIGS. 14-16) and thereafter, after a displacement aimed to bring a free portion at a second noise reducing element 12, picks up the latter (FIGS. 17-19) and arranges them on the gripping surface 39 with the larger dimensions "L" thereof parallel to length "B" of said gripping surface 39 and with the smaller dimensions "W" of said noise reducing elements 12 facing each other. In the example shown in the accompanying FIGS. 14-19, the third transport surface 33 and the reducing elements 12 are stationary while the picking up and application head 36 moves to pick up the above two noise reducing elements 12. As shown in FIG. 20, the picking up and application head 36 applies the two noise reducing elements 12 with the larger dimensions "L" thereof directed in the circumferential direction, so as to obtain a tyre 2 such as that in FIGS. 6 and 7.

In a variant of the method according to the invention, instead of as a function of the maximum section width "C", it is contemplated to orient the noise reducing elements 12 in tyre 2 as a function of width "P" of the tread band 9 of tyre 2, more particularly as a function of a ratio "P/L" between said width "P" and the larger dimension "L" of the noise reducing elements 12. In this case, the predefined value of such a ratio "P/L" (which differentiates between circumferential and axial orientation of the noise reducing elements 12) is equal to about 1.

The process, the method and the apparatus described above allow manufacturing a plurality of tyres 2 for vehicle wheels, in which at least one of said tyres 2 has sizes different from the other tyres 2 but all tyres 2 comprise like noise reducing elements 12. Preferably, as described above, tyres 2 arrive in apparatus 18 for applying noise reducing elements 12, wherein tyres 2 in one group have the same sizes and tyres 2 in different groups have different sizes. However, all tyres 2 in such groups comprise like noise reducing elements 12, optionally oriented in a different way.

Two examples of said plurality are for example depicted in FIGS. 6, 7 and 8, 9. The tyre in FIGS. 6 and 7 has a maximum section width "C" that is smaller than the maximum section width of the tyre in FIGS. 8 and 9 but both have like noise reducing elements 12. In the tyre in FIGS. 6 and 7, the noise reducing elements 12 are all arranged in the same way with the larger dimension "L" directed in a circumferential direction. Also in the tyre in FIGS. 8 and 9, the noise reducing elements 12 are all arranged in the same way but with the larger dimension "L" directed in an axial direction.

Preferably, although tyres 2 of said plurality do not have all the same sizes, they fall within a same class. Classes are defined in terms of the ratio between the sizes of tyre 2 and the size of the noise reducing elements 12.

For example, tyres 2 of said plurality all have a ratio between the maximum section width "C" and the smaller dimension "W" of the noise reducing elements 12 greater than a predefined value, for example equal to 1.2, and a ratio between the maximum section width "C" and the larger dimension "L" of the noise reducing elements 12 smaller than a predefined value, for example equal to 1.5.

Alternatively, tyres 2 of said plurality all have a ratio between width "P" of the tread band 9 and the smaller dimension "W" greater than about 1 and a ratio between a width "P" and the larger dimension "L" of the noise reducing elements 12 smaller than about 1.5.

Outside of these ranges, the selected noise reducing elements 12 do not carry out an effective noise attenuation, as they are too small in relation to tyres 2 or may interfere with tyre 2 and deteriorate, as they are too large with respect to said tyre 2.

Therefore, if a plurality of tyres 2 belonging to a different class are to be manufactured, the shape and/or size of the noise reducing elements used will have to be changed (in terms of larger dimension and/or smaller dimension and/or thickness) and the picking up and application head 36 will optionally have to be changed too.

The invention claimed is:

1. A method for applying noise reducing elements to tyres for vehicle wheels, comprising:

feeding, in a sequence, noise reducing elements according to a predetermined path, wherein the noise reducing elements all have a same shape and all have in plan a substantially same larger dimension and a same smaller dimension;

feeding, in a sequence, a plurality of tyres for vehicle wheels, each tyre of the plurality of tyres has a size, wherein the size of at least one tyre is different from the size of at least one other tyre of the plurality of tyres;

picking up the noise reducing elements from the predetermined path; and applying a plurality of the noise reducing elements to a radially inner surface of each tyre of the plurality of tyres, wherein applying comprises: orienting the noise reducing elements as a function of the size of each tyre of the plurality of tyres to which the noise reducing elements are applied, and wherein orienting comprises: arranging the noise reducing elements with the larger dimension directed in a circumferential direction in the at least one tyre and arranging the noise reducing elements with the larger dimension directed in an axial direction in the at least one other tyre.

2. The method according to claim 1, wherein orienting is carried out as a function of a ratio of a maximum section width of each tyre of the plurality of tyres to which the noise reducing elements are applied and the larger dimension of the noise reducing elements.

3. The method according to claim 2, wherein, if the ratio between the maximum section width and the larger dimension is smaller than a predefined value, orienting comprises: arranging the noise reducing elements with the larger dimension directed in the circumferential direction.

4. The method according to claim 2, wherein, if the ratio between the maximum section width and the larger dimension is greater than a predefined value, orienting comprises: arranging the noise reducing elements with the larger dimension directed in the axial direction.

5. The method according to claim 1, further comprising: measuring the sizes of the plurality of tyres, and then orienting the noise reducing elements.

6. The method according to claim 5, wherein measuring the sizes of the plurality of tyres comprises: measuring a maximum section width of each tyre of the plurality of tyres.

7. The method according to claim 1, wherein a number of the noise reducing elements is applied in each tyre, wherein the number is a function of an inner diameter of the radially inner surface of each tyre of the plurality of tyres to which the number of noise reducing elements is applied.

8. The method according to claim 1, wherein for each tyre of the plurality of tyres, the noise reducing elements are applied with a circumferential distance between each noise reducing element, and wherein the circumferential distance is a function of an inner diameter of the radially inner surface of the tyre to which the noise reducing elements are applied.

9. The method according to claim 1, wherein picking up comprises: picking up a single noise reducing element of the noise reducing elements at a time.

10. The method according to claim 1, wherein picking up comprises: picking up at least two noise reducing elements of the noise reducing elements at a time.

11. The method according to claim 1, wherein applying a plurality of the noise reducing elements further comprises: applying a single noise reducing element of the noise reducing elements at a time.

12. The method according to claim 1, wherein applying a plurality of the noise reducing elements further comprises: applying at least two noise reducing elements of the noise reducing elements at a time.

13. The method according to claim 1, further comprising, after picking up and before applying, a movement chosen from translating and rotating the noise reducing elements picked up.

14. The method according to claim 1, wherein the noise reducing elements are all oriented on the predetermined path with their larger dimensions mutually facing and mutually parallel.

15. The method according to claim 1, wherein the noise reducing elements are all oriented on the predetermined path with their smaller dimensions mutually facing and mutually parallel.

* * * * *